(12) United States Patent
Eichman et al.

(10) Patent No.: US 8,686,081 B2
(45) Date of Patent: Apr. 1, 2014

(54) AQUEOUS COATING COMPOSITION

(75) Inventors: Henry Jude Eichman, Havertown, PA (US); Josephine Louise Eldredge, Norristown, PA (US); Ann Robertson Hermes, Ambler, PA (US); Afia Sarpong Karikari, Bristol, PA (US); Paul Mercando, Pennsburg, PA (US); Theodore Tysak, Ambler, PA (US)

(73) Assignee: Rohm and Haas Company, Philadelphia, PA (US)

( * ) Notice: Subject to any disclaimer, the term of this patent is extended or adjusted under 35 U.S.C. 154(b) by 213 days.

(21) Appl. No.: 12/917,595

(22) Filed: Nov. 2, 2010

(65) Prior Publication Data

US 2011/0118409 A1 May 19, 2011

Related U.S. Application Data

(60) Provisional application No. 61/281,455, filed on Nov. 18, 2009.

(51) Int. Cl.
*C09G 1/04* (2006.01)
*C09G 1/16* (2006.01)
*C08F 220/18* (2006.01)

(52) U.S. Cl.
USPC ............................ 524/436; 524/547; 526/274

(58) Field of Classification Search
USPC ............................ 524/556, 436, 547; 526/274
See application file for complete search history.

(56) References Cited

U.S. PATENT DOCUMENTS

| | | | |
|---|---|---|---|
| 3,467,610 A | 9/1969 | Flarman et al. | |
| 4,006,020 A | 2/1977 | Polastri | |
| 4,150,005 A | 4/1979 | Gehman | |
| 4,455,402 A | 6/1984 | Amick | |
| 4,460,734 A | 7/1984 | Owens et al. | |
| 4,517,330 A | 5/1985 | Zdanowski | |
| 5,149,745 A | 9/1992 | Owens | |
| 5,541,265 A | 7/1996 | Gomi et al. | |
| 5,574,090 A | 11/1996 | Gray et al. | |
| 6,020,413 A | 2/2000 | Wolff | |
| 6,043,314 A | 3/2000 | Owens | |
| 6,228,913 B1 | 5/2001 | Owens | |
| 6,290,866 B1 | 9/2001 | Lesko | |
| 6,548,596 B1 | 4/2003 | Kohr et al. | |
| 6,555,615 B2 | 4/2003 | Van Rheenen | |
| 6,586,516 B1 | 7/2003 | Kesselmayer et al. | |
| 6,613,832 B2 | 9/2003 | Friel | |
| 6,664,329 B2 | 12/2003 | Gwin | |
| 2004/0097644 A1 | 5/2004 | Katou et al. | |
| 2007/0254108 A1 | 11/2007 | Schopke et al. | |
| 2008/0114114 A1 | 5/2008 | Eichman et al. | |

FOREIGN PATENT DOCUMENTS

JP 05-263046 10/1993
JP 2002188059 A * 7/2002

OTHER PUBLICATIONS

T.G. Fox, "Influence of Diluent and Copolymer Compostion on the Glass Temperture of a Polymer System," Bull. of the A.P.S., series II vol. 1, p. 123, 1956.

* cited by examiner

*Primary Examiner* — Kelechi Egwim
(74) *Attorney, Agent, or Firm* — Kenneth Crimaldi

(57) ABSTRACT

An aqueous coating composition containing a polymer which contains calcium or magnesium and polymerized residues of three monomers. The first monomer is a complexing monomer having a log stability constant for calcium or magnesium from 0.3 to 4. The second monomer is methacrylic acid. The third monomer is a crosslinker.

13 Claims, No Drawings

AQUEOUS COATING COMPOSITION

This application claims the benefit of priority under 35 U.S.C. §119(e) of U.S. Provisional Patent Application No. 61/281,455 filed on Nov. 18, 2009.

This invention relates to an aqueous coating composition particularly useful as a floor finish.

Aqueous coating compositions used on floors and other surfaces have traditionally used transition metal ions, e.g., zinc, to add in crosslinking. More recent efforts have been directed towards using environmentally more acceptable metal ions such as calcium and magnesium as ionic crosslinkers. For example, U.S. Pub. No. 2007/0254108 discloses compositions using calcium. However, none of the prior art compositions using calcium or magnesium provides a combination of properties that would satisfy commercial needs.

The problem addressed by the present invention is to provide an aqueous coating composition using calcium or magnesium as an ionic crosslinker.

STATEMENT OF INVENTION

The present invention provides an aqueous coating composition comprising a polymer; said polymer comprising: (a) at least one of calcium ion and magnesium ion; and (b) polymerized residues of: (i) from 0.5 to 7 wt % of at least one monomer having a log stability constant for calcium or magnesium from 0.3 to 4; (ii) from 5 to 15 wt % methacrylic acid; and (iii) from 0.2 to 3 wt % of at least one crosslinker; wherein the polymer has a Tg from 50 to 110° C.

The present invention is further directed to a method for coating a substrate by applying the aqueous coating composition to the substrate.

DETAILED DESCRIPTION

Percentages are weight percentages (wt %), temperatures are in ° C. and stability constants are measured at ambient temperature (typically 20-25° C.), unless specified otherwise. Weight percentages of monomers are based on the total weight of monomers in the polymerization mixture. All polymer Tg values were measured by differential scanning calorimetry (DSC), using a heating rate of 10° C. per minute with the Tg taken at the midpoint of the transition.

As used herein the term "(meth)acrylic" refers to acrylic or methacrylic, and "(meth)acrylate" refers to acrylate or methacrylate. The term "(meth)acrylamide" refers to acrylamide (AM) or methacrylamide (MAM). "Acrylic monomers" include acrylic acid (AA), methacrylic acid (MAA), esters of AA and MAA, itaconic acid (IA), crotonic acid (CA), acrylamide (AM), methacrylamide (MAM), and derivatives of AM and MAM, e.g., alkyl (meth)acrylamides. Esters of AA and MAA include, but are not limited to, alkyl, hydroxyalkyl, phosphoalkyl and sulfoalkyl esters, e.g., methyl methacrylate (MMA), ethyl methacrylate (EMA), butyl methacrylate (BMA), isobutyl methacrylate (iBMA), hydroxyethyl methacrylate (HEMA), hydroxyethyl acrylate (HEA), methyl acrylate (MA), ethyl acrylate (EA), butyl acrylate (BA), ethylhexyl acrylate (EHA) and phoshoethylmethacrylate (PAM). The term "vinyl monomers" refers to monomers that contain a carbon-carbon double bond that is connected to a heteroatom such as nitrogen or oxygen. Examples of vinyl monomers include, but are not limited to, vinyl acetate, vinyl formamide, vinyl acetamide, vinyl pyrrolidone, vinyl caprolactam, and long chain vinyl alkanoates such as vinyl neodecanoate, and vinyl stearate. The term "aromatic-acrylic polymers" refers to polymers of acrylic monomers and vinyl aromatic monomers or vinyl cyclohexyl monomers. Vinyl aromatic monomers have one ethylenically unsaturated group per molecule. Examples of vinyl aromatic monomers include 4-methylstyrene, 2-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 4-t-butylstyrene, 2,4-dichlorostyrene, 2,6-dichlorostyrene, 1-vinylnaphthalene, cyclohexyl methacrylate, benzyl methacrylate and benzyl acrylate. Preferred vinyl aromatic monomers include vinylpyridines, styrene (Sty) and 4-methylstyrene (vinyltoluene). The term "styrene-acrylic polymers" refers to polymers of acrylic monomers and copolymers comprising at least 50% of acrylic monomers, styrene and vinyltoluene. Preferably, styrene-acrylic polymers have at least 75% of monomer residues derived from (meth)acrylic acids, (meth)acrylates or styrene, more preferably at least 85%, and most preferably at least 95%. Preferably, any remaining monomer units are derived from vinyl monomers.

For purposes of this invention, alkyl groups are straight or branched chain alkyl groups or aralkyl or alkyl carbocyclic groups, such as alkylphenyl groups. In some embodiments of the invention, the alkyl groups are of synthetic origin and may contain a range of chain lengths. In some embodiments of the invention, alkyl groups are straight or branched chain acyclic alkyl groups.

The aqueous coating composition comprises ions of calcium, magnesium or a combination thereof. In some embodiments of the invention, the composition is substantially free of transition metal ions, e.g., it contains less than 0.5%, alternatively less than 0.2%, alternatively less than 0.1%, alternatively less than 0.05%. In some embodiments of the invention, the composition contains at least 0.1 equivalents of calcium and/or magnesium per equivalent of acid in the polymer, alternatively at least 0.15 equivalents, alternatively at least 0.2 equivalents, alternatively at least 0.23 equivalents; in some embodiments the composition contains no more than 0.7 equivalents of calcium and/or magnesium per equivalent of acid in the polymer, alternatively no more than 0.6 equivalents, alternatively no more than 0.5 equivalents, alternatively no more than 0.4 equivalents, alternatively no more than 0.35 equivalents. Equivalents of acid in the polymer are calculated from the total acid content of the polymer, including carboxylic acid groups, phosphonate groups, etc. In some embodiments of the invention, the composition comprises calcium.

In some embodiments of the invention, the polymer further comprises monomer residues of $C_1$-$C_8$ alkyl (meth)acrylate(s). In some embodiments of the invention, the $C_1$-$C_8$ alkyl (meth)acrylate(s) comprise an alkyl methacrylate and an alkyl acrylate, alternatively a $C_1$-$C_2$ alkyl methacrylate (MMA or EMA) and a $C_4$-$C_8$ alkyl acrylate (e.g., BA or EHA), alternatively MMA and a $C_4$-$C_8$ alkyl acrylate, alternatively MMA and BA. In some embodiments of the invention the total amount of $C_1$-$C_8$ alkyl (meth)acrylate monomer residues is from 34% to 70%. In some embodiments, the total amount of $C_1$-$C_8$ alkyl (meth)acrylate monomer residues is at least 36%, alternatively at least 38%, alternatively at least 40%, alternatively at least 42%, alternatively at least 44%, alternatively at least 46%, alternatively at least 48%. In some embodiments, the total amount of $C_1$-$C_8$ alkyl (meth)acrylate monomer residues is no greater than 68%, alternatively no greater than 66%, alternatively no greater than 64%, alternatively no greater than 62%, alternatively no greater than 60%. In some embodiments of the invention, the polymer has a Tg of at least 55° C., alternatively at least 60° C., alternatively at least 65° C., alternatively at least 70° C., alternatively at least 75° C., alternatively at least 80° C.; in some embodiments the Tg is no more than 105° C., alternatively no more than 100° C., alternatively no more than 95° C., alternatively no more than 90° C., alternatively no more than 85° C. One skilled in the art would be able to select monomers to arrive at any desired Tg value. The identities and amount of the individual monomers are not critical if the Tg is in the range stated above.

In some embodiments of the invention, the polymer comprises at least one monomer having a log stability constant for calcium or magnesium of at least 0.4, alternatively at least 0.5. In some embodiments of the invention, the log stability constant for calcium or magnesium is no greater than 3.5, alternatively no greater than 3, alternatively no greater than 2.5, alternatively no greater than 2, alternatively no greater than 1.5. In some embodiments of the invention, the monomer has a log stability constant for calcium which is within the limits stated above. In some embodiments of the invention, the polymer contains at least 0.7% polymerized residues of at least one monomer having a log stability constant for calcium or magnesium within the previously stated limits (complexing monomer), alternatively at least 0.9%, alternatively at least 1.1%, alternatively at least 1.3%, alternatively at least 1.5%, alternatively at least 1.6%, alternatively at least 1.7%; in some embodiments the polymer contains no more than 6.5% polymerized residues of at least one complexing monomer, alternatively no more than 6%, alternatively no more than 5.5%, alternatively no more than 5%, alternatively no more than 4.5%, alternatively no more than 4%, alternatively no more than 3.5%, alternatively no more than 3%, alternatively no more than 2.5%. In some embodiments of the invention, the complexing monomer is acrylic acid, itaconic acid or a combination thereof.

In some embodiments of the invention, the polymer contains at least 6% polymerized residues of methacrylic acid, alternatively at least 7%, alternatively at least 8%, alternatively at least 9%; in some embodiments, the polymer contains no more than 14% polymerized residues of methacrylic acid, alternatively no more than 13%, alternatively no more than 12%.

In some embodiments of the invention, the polymer contains from 25 to 50 wt % of at least one vinyl aromatic monomer. In some embodiments, the polymer contains at least 28% polymerized residues of at least one vinyl aromatic monomer, alternatively at least 30%, alternatively at least 32%; in some embodiments, the polymer contains no more than 45% polymerized residues of at least one vinyl aromatic monomer, alternatively no more than 42%, alternatively no more than 40%, alternatively no more than 38%. In some embodiments of the invention, the polymer comprises residues of styrene.

Crosslinkers are monomers having two or more ethylenically unsaturated groups, and may include, e.g., divinylaromatic compounds, di-, tri- and tetra-(meth)acrylate esters, di-, tri- and tetra-allyl ether or ester compounds and allyl (meth) acrylate. Preferred examples of such monomers include divinylbenzene (DVB), trimethylolpropane diallyl ether, tetraallyl pentaerythritol, triallyl pentaerythritol, diallyl pentaerythritol, diallyl phthalate, diallyl maleate, triallyl cyanurate, Bisphenol A diallyl ether, allyl sucroses, methylene bisacrylamide, trimethylolpropane triacrylate, allyl methacrylate (ALMA), ethylene glycol dimethacrylate (EGDMA), hexane-1,6-diol diacrylate (HDDA) and butylene glycol dimethacrylate (BGDMA). Especially preferred crosslinkers include DVB, ALMA, EGDMA, HDDA and BGDMA. In some embodiments of the invention, the amount of polymerized crosslinker residue in the polymer is at least 0.3%, alternatively at least 0.4%, alternatively at least 0.5%, alternatively at least 0.6%, alternatively at least 0.7%, alternatively at least 0.8%, alternatively at least 0.9%, alternatively at least 1%, alternatively at least 1.1%. In some embodiments of the invention, the amount of crosslinker residue in the polymer is no more than 2.7%, alternatively no more than 2.4%, alternatively no more than 2.1%, alternatively no more than 1.8%, alternatively no more than 1.5%. In some embodiments of the invention, the amount of crosslinker residue is from 0.7% to 3%, alternatively from 0.9% to 2.8%, alternatively from 1.2% to 2.7%; in these embodiments, the molecular weight of the crosslinker is from 180 to 330, alternatively from 200 to 300. In some embodiments of the invention, the crosslinker is diethylenically unsaturated, e.g., DVB, ALMA or di(meth)acrylate esters of diols. In some embodiments, the polymer comprises a diethylenically unsaturated crosslinker with molecular weight from 100 to 250, alternatively from 110 to 230, alternatively from 110 to 200, alternatively from 115 to 160. In some embodiments of the invention, the crosslinker is triethylenically unsaturated. In some embodiments of the invention, both triethylenically unsaturated crosslinker and diethylenically unsaturated crosslinker are present. In some embodiments of the invention, the wt % of crosslinker varies from that which would make the factor (wt %×functionality/2)/(MW/130) equal to 0.2 to that which would make the factor equal 1.7, where the functionality is the number of ethylenically unsaturated units in the crosslinker and MW is its molecular weight. This factor accounts for the fact that crosslinkers with higher MW (for the same functionality) are used at higher levels and crosslinkers with functionality greater than two (for the same MW) are used in smaller amounts. In some embodiments, the factor is at least 0.3, alternatively at least 0.4, alternatively at least 0.5, alternatively at least 0.6, alternatively at least 0.7, alternatively at least 0.8, alternatively at least 0.9, alternatively at least 1. In some embodiments, the factor is no greater than 1.6, alternatively no greater than 1.5.

In some embodiments of the invention, the aqueous coating composition comprises from 10% to 25% of the polymer, alternatively from 11% to 20%, alternatively from 12% to 18%, alternatively from 13% to 16%. Percentages are calculated based on the amount of polymer solids in the entire weight of the coating composition. In some embodiments, more than one polymer according to this invention may be present, with the total amount of polymers being within the amounts specified above.

In some embodiments of the invention, the polymers used in this invention are prepared by copolymerizing the monomers using well known emulsion polymerization processes, and any other suitable processes known in the art, using, for example, a free-radical initiator such as peroxygen compounds or diazo compounds and, optionally, chain transfer agents. The length of the primary polymer chains is typically such that, if any crosslinks were removed, the molecular weight ($M_w$) would be in the range of about 50,000 to 10,000,000, alternatively from 100,000 to 5,000,000, alternatively from 200,000 to 2,000,000.

Preferably, the polymers of this invention are aromatic-acrylic polymers, more preferably styrene-acrylic polymers. Preferably, the aqueous coating composition has at least 45% water, alternatively at least 50%, alternatively at least 55%, alternatively at least 60%, alternatively at least 65%. Preferably, the aqueous composition contains no more than 10% organic solvent, alternatively no more than 8%, alternatively no more than 6%. In some embodiments, the composition contains at least 2% organic solvent, alternatively at least 4%, alternatively at least 4.5%.

The composition of the present invention optionally may include other ingredients, e.g., waxes, alkali-soluble resins, plasticizers, wetting aids, defoamers, soluble or dispersed biocides, polyurethane dispersions, silicates, etc. The alkali-soluble resins of this invention are in the range of 0% to 10%, more preferably 2% to 7%. The waxes are used in a range of 5% to 20%, more preferable 7% to 15%.

In the method of this invention, the aqueous composition is applied to a surface, e.g., floors, walls, counter tops, roofs, etc. Materials to which the composition may be applied include stone, concrete, asphalt, roofing substrates, linoleum, tile, wood, particle or fiber board, glass, leather, paper and cardboard. In some embodiments of the invention, the composition is applied to floors. Preferably, the composition is cured under ambient conditions without external heating, ventilation or humidity control, although these may be used as needed.

Evaluating the Performance of Floor Polish Coatings

In order to properly evaluate the performance of an emulsion polymer intended for use in a polish vehicle, it is necessary that the polymer be formulated as a polish. The formulation of the emulsion polymers of this invention are done in a manner common and well understood to those versed in this art. The ingredients used, and their proportions and manner of addition are the same as is commonly practiced with conventional technology emulsion polymers. The ingredients used in a formulated floor polish consists of emulsion polymer, wax emulsions, Alkali Soluble Resins (ASR), film formation aids, leveling agents, and wetting agents. The levels of coalescing solvents, plasticizing solvents and leveling agents used in a polish formulation is dictated by the compatibility of the emulsion polymer (overall composition of the polymer) with the selected solvents and additives and the minimum filming temperature of the emulsion polymer. For the emulsion polymer of the examples listed here, the coalescent, plasticizer and additive levels were as given in the formulation details, though minor adjustments were made as was appropriate to ensure that each of the polymer examples formed a glossy, apparently coherent film.

Test Methods:

Various tests were used to evaluate the performance of the emulsion polymer vehicle as a removable floor polish (or floor coating) in this invention. The surface coatings were evaluated for gloss, leveling, tack-free time, gloss retention, soil resistance, black heel mark and scuff resistance, water resistance and detergent resistance. The test methods used in the evaluation of the surface coating, of this invention, are standard tests that are well understood to those versed in this art. Additional testing was also performed on the Accelerated Wear Tester (AWT). The AWT is disclosed in U.S. 2008/0000285. The AWT simulates, in an accelerated manner, the wear and maintenance that typical floor coatings are exposed to. Test methods were developed on the AWT that correlate to the wear and maintenance conditions that typical floor polishes are exposed to in the field. The AWT has equipment that measures and records gloss and color. The following test methods were used to evaluate the performance of the emulsion polymer vehicle that is the subject of this invention.

Coating Application for Evaluating the Bench Properties of Aqueous Floor Coating Compositions:

The method for applying the floor polish coatings to substrates for testing purposes is described in "Annual Book of ASTM Standards," Section 15, Volume 15.04, Test Procedure ASTM D 1436 (200), Test Method B. Floor polish was applied to vinyl composition tiles or vinyl tiles, two to five coats of polish, as specified by the test reported below, based on formulations in tables (6, 13, 17, 20, 23, 26, 32, 35, 38, 41, 46). Floor coatings were applied with ca. 30 to 60 minute dry time between coats, or as specified in each test, coated panels were allowed to cure at ambient conditions for 24 hours, or as specified by the test.

Lay Down Gloss Test Method:

This test is run on a black vinyl composition tile (BVCT). The method that was used for determining gloss is described in "Annual Book of ASTM Standards", Section 15, Volume 15.04, Test Procedure ASTM D 1455. A Gardner Byk MicrotriGloss meter was used to record the 20-degree and 60-degree gloss. This measured gloss is sometimes referred to as quantitative gloss. The gloss evaluation is done on four to five coats of finish and is compared to a control finish. The gloss is measured after each applied coating has dried and prior to application of the next coat of floor polish. It is also measured on the next day (16-24 hours after the final coating has been applied). The gloss values are reported in tabular forms. Visually, the coated tiles are also evaluated; this is sometimes referred to as qualitative gloss.

The gloss was rated on a scale of from 1 to 5, as follows:
1=poor; 2=fair; 3=good; 4=very good; 5=excellent Leveling Test Method:

This test is run on black vinyl tile (BVT) and/or (BVCT). Immediately after spreading the floor polish on the tile, an "X" is placed in the wet polish surface by drawing the gauze pad applicator diagonally from corner to corner of the test area. This can also be performed with a mop when the test area is a floor test. After the film has dried, the coating is examined visually to determine the extent of the disappearance of the "X". The leveling was rated on a scale of from 1 to 5, as follows:
1=poor, outline of the "X" ridges and obvious dewetting is present; 2=fair, plain outline of "X" and ridges detectable; 3=good, plain outline of "X" detectable, but no ridges; 4=very good, faint outline of the "X" detectable, but no ridges; 5=excellent, no "X" detectable Tack-Free Time Test Method:

The surface coatings tack-free time is determined using the Zapon tack tester. The tack tester was fabricated out of a 1-inch wide bent piece of aluminum sheet metal that is $1/16^{th}$ inch (1.6 mm) thick. It is sized so that a 1 in$^2$ (2.54 cm) section will rest flatly on the surface. It is weighted so that when a five gram weight is placed on the center of the aluminum strip it will stand upright. If a weight less than five grams is placed on the center of the aluminum strip it will fall over. The tack tester is placed on the surface of the film with a 500-gram weight placed on the tester. The weight is kept on the tester for five seconds then removed. If the tester falls over within five seconds the coating is deemed tack free. The time that has elapsed from when the coating was applied to tack free time was rated on a scale of 1 to 5 as follows:
1=poor, Zapon tack free time greater than 45 minutes; 2=fair, Zapon tack free time from 39 to 45 minutes; 3=good, Zapon tack free time 32 to 39 minutes; 4=very good, Zapon tack free time 25 to 32 minutes; 5=excellent, Zapon tack free time 18 to 25 minutes 1 Hour Water Resistance Test:

This test is performed on BVCT coated with at least three coats of the test finish. The coating is allowed to dry for 16 to 24 hours before running this test. A circle (approximately one inch {2.54 cm} in diameter) is drawn of the dry coating with a china marker. The spot of clean water fills the circle contacting any where from three to five coats of finish. The water spot is allowed to stand for sixty minutes at ambient temperature. At the end of this sixty minutes the spot of water is removed by blotting the area with a dry tissue. Evaluate the circle for any discoloration or damage to the film.

The 1 hour water resistance was rated on a scale of from 1 to 5, as follows:
1=poor, more than 25 percent of film removed; 2=fair, 16-25 percent of film removed 3=good, 6-15 percent of film removed; 4=very good, slight gloss reduction and/or less than 5 percent of the film; 5=excellent, no water mark or damage
Next Day Water Resistance Test Method:

This test is similar to the 1 hour water resistance test. The only difference is that the floor coating is allowed to dry for 16 to 24 hours before the spot of water is applied to the BVCT. The next day water resistance was rated on a scale of from 1 to 5, as follows:
1=poor, more than 16 percent of film removed; 2=fair, 11-15 percent of film removed 3=good, 6-10 percent of film removed; 4=very good, slight gloss reduction and/or less than 5 percent of the film; 5=excellent, no water mark or damage
Alkaline Detergent Resistance Test Method:

BVCT is coated with at least three coats of the test finish. The coating is allowed to dry for 16 to 24 hours before running this test. A circle (approximately one inch {2.54 cm} in diameter) is drawn of the dry coating with a china marker. The spot of diluted alkaline floor cleaner (GP FORWARD from Johnson Diversey) fills the circle contacting any where from three to five coats of finish. The detergent spot is allowed to stand for thirty minutes at ambient temperature. At the end of this thirty minutes spot is removed by blotting the area with a dry tissue. Evaluate the circle for any discoloration or damage to the film.
The alkaline detergent resistance was rated on a scale of from 1 to 5, as follows:
1=poor, more than 50 percent of film removed; 2=fair, 25-50 percent of film removed 3=good, 10-25 percent of film removed; 4=very good, slight gloss reduction and/or less than 10 percent of the film; 5=excellent, no water mark or damage
1 Hour Neutral Detergent Resistance Test Method:

BVCT is coated with at least three coats of the test finish. This test is run when the coating is dry one hour after the last coat of finish was applied. A circle (approximately one inch {2.54 cm} in diameter) is drawn of the dry coating with a china marker. The spot of diluted neutral floor cleaner (STRIDE from Johnson Diversey) fills the circle contacting any where from two to five coats of finish. The detergent spot is allowed to stand for thirty minutes at ambient temperature. At the end of this time spot is removed by blotting the area with a dry tissue. Evaluate the circle for any discoloration or damage to the film.
The neutral detergent resistance was rated on a scale of from 1 to 5, as follows:
1=poor, more than 50 percent of film removed; 2=fair, 25-50 percent of film removed 3=good, 10-25 percent of film removed; 4=very good, slight gloss reduction and/or less than 10 percent of the film; 5=excellent, no water mark or damage
Next Day Neutral Detergent Resistance Test Method:

This test is performed on BVCT coated with at least three coats of the test finish. The coating is allowed to dry for 16 to 24 hours before running this test. A circle (approximately one inch in diameter) is drawn of the dry coating with a china marker. The spot of diluted neutral floor cleaner (STRIDE from Johnson Diversey) fills the circle contacting any where from three to five coats of finish. The detergent spot is allowed to stand for thirty minutes at ambient temperature. At the end of this thirty minutes spot is removed by blotting the area with a dry tissue. Evaluate the circle for any discoloration or damage to the film.
The neutral detergent resistance was rated on a scale of from 1 to 5, as follows:
1=poor, more than 50 percent of film removed; 2=fair, 25-50 percent of film removed 3=good, 10-25 percent of film removed; 4=very good, slight gloss reduction and/or less than 10 percent of the film; 5=excellent, no water mark or damage
Black Heel Mark and Scuff Resistance Test Method:

Two coats of finish are applied to the 12" (30.5 cm)×12" tile in a CTR (75° F. {77° C.} at 50% humidity). The tiles are aged, in the CTR, for 24 hours prior to running the test. The marks are generated in the Snell Capsule containing 6 black rubber heels run at 50 rpm for ten minutes in each direction (forward and reverse). The tiles are removed and compared to a control finish on a control tile. Visually evaluate the tiles.
The black heel mark and scuff resistance was rated on a scale of from 1 to 5, as follows:
1=poor, heavy scattering of marks; 2=fair, moderate to heavy scattering of marks 3=good, moderate scattering of marks; 4=very good, slight to moderate scattering of marks; 5=excellent, slight scattering of marks
Mar Resistance Test Method:

This test is based on striking the coating at a shallow angle with a hard object; in the examples provided, the object was the fingernail of the individual performing the test. This test gives an indication of how the coating will resist marring, which leads to gloss reduction of the coating. After the coating is applied to the substrate and allowed to cure, the coated substrate is placed on a solid surface such as a table top and struck with operator's fingernail. The operators finger nail is kept parallel to the coated surface and the impact angle is greater than 45° from normal of the surface, to increase the likelihood of marking the coating, When comparing coatings, it is important that the same operator perform the test. This test was designed to distinguish relative differences. The mar resistance was rated on a 1 to 5 scale, as follows: 1=poor, highly visible deep scratches are present; 3=good, visible scratches are present; 5=excellent, marks are barely perceptible
Gloss Retention Using the Accelerated Wear Tester (AWT) Test Method:

The method for applying the floor polish coatings to substrates for testing purposes is described in "Annual Book of ASTM Standards," Section 15, Volume 15.04, Test Procedure ASTM D 1436 (200), Test Method B. Four coats of finish were applied to the substrate with approximately 30 to 60 minutes of dry time between coats. The coating was applied in a constant temperature room maintained at 75° F.±5° F. and a relative humidity of 50%±5%. The preferred substrate for the gloss retention test was BVCT. The key property being evaluated was gloss retention. After the fourth coat was applied the coating set for approximately 16 to 24 hours prior to any testing on the AWT. The gloss meter, as previously described, was fitted to a "robotic" arm that through the control program of the AWT routinely measure measured and recorded the gloss of the coated substrates.

The AWT settings, as disclosed in US 2008/0000285 A1, were used to impart wear onto the coating being tested. The following sequence of steps reported in Table 1, were performed, in order, each cycle. The cycle was complete after the completion of step #12. The cycles were then repeated, building up a series of wear and maintenance steps. The initial gloss data corresponds to gloss measurements before any processing or maintenance. The gloss was typically measure every five cycles. This allows us to plot the performance over cycle number, where the cycle number correlates to time. The following multi-step wear profile listed in Table 1 was performed. The experiment ran for 50 to 150 cycles. At a minimum a final gloss measurement occurs after the last cycle is complete.

TABLE 1

AWT High Maintenance Wear Profile

| Step | Name | Function |
|------|------|----------|
| 1 | Gloss measurement | measure 20° & 60° gloss |
| 2 | Color measurement | measure L* a* b* (reflectance, non contact) |
| 3 | Dirt | Pass tiles under soil hopper to deposit synthetic soil on BVCT |
| 4 | Soil | Grind synthetic soil in to coating with 7 double passes under roller at 30 psig |
| 5 | Vacuum | Remove loose soil with vacuum. |
| 6 | Wet | Wet tile with water from spray nozzle to minimize dust. |
| 7 | Clean | 2 double passes under auto-scrubber with a neutral floor cleaner |
| 8 | Wait | Hold for 15 minutes to allow auto-scrubber to dry off |
| 9 | Dry | Pass tiles under air knife for five minutes to dry coating |
| 10 | Burnish | Pass tiles under burnisher twice (burnish pad at 1500 rpm) to repair gloss |
| 11 | Dry | 1 double passes under air knife to remove residual dust |
| 12 | Wait | Hold for 15 minutes to allow coating to recover Return to step 1 or step 3 and repeat |

Gloss Measurements:

The measured and recorded gloss values, are an average of six to eight gloss measurements (20° gloss and 60° gloss). The AWT measures and records the gloss values. The initial gloss measurements (cycle 0) were recorded by the AWT prior to any wear steps being performed. It should correlate well with the next day gloss values. The gloss retention is determined by evaluating the measured quantitative gloss values, and the visual qualitative gloss, at the end of the run compared to the initial gloss values. These results are then compared to a control finish that is run under the same high maintenance wear profile.

The gloss retention was rated on a 1 to 5 scale, as follows:
1=poor, complete film removal, final gloss substantially less than the initial gloss; 2=fair, moderate film removal, final gloss less the initial gloss; 3=good, partial film removal, final gloss similar to initial gloss; 4=very good, negligible film removal, final gloss better than initial gloss; 5=excellent, film in tack, final gloss substantially better than the initial gloss.

Soil Resistance Using the AWT Test Method:

This test is run using white vinyl composition tiles (WVCT) the coating application procedure has been previously described. Four coats of the floor coating were applied in the CTR (75° F.±5° F. and 50%±5% humidity) and the coating set for 16 to 24 hours prior to the AWT run. The key property being evaluated was color change. In this AWT wear profile, a series of steps, listed in Table 2, are performed in order. The cycle was complete after the completion of step #11. The cycles were then repeated, building up a series of wear and maintenance steps. The color is measure every cycle. This allows us to plot the performance over cycle number, where the cycle number correlates to time. The following multi-step wear profile listed in Table 2 was performed. The experiment ran for 10 to 40 cycles.

TABLE 2

AWT Soil Resistance Wear Profile

| step | Name | Function |
|------|------|----------|
| 1 | Color | measure L* a* b* (reflectance, non contact) |
| 2 | Clean | 5 double passes under auto-scrubber with a disinfecting floor cleaner |
| 3 | Wait | Hold for 15 minutes to allow scrubber to dry |
| 4 | Dry | Pass tiles under air knife for ten minutes to dry coating |
| 5 | Dirt | Pass tiles under soil hopper to deposit synthetic soil on WVCT |
| 6 | Soil | Grind synthetic soil into coating with 10 double passes under roller at 30 psig |
| 7 | Vacuum | Remove loose soil with vacuum. |
| 8 | Wet | Wet tile with water from spray nozzle to minimize dust. |
| 9 | Clean | 1 double passes under auto-scrubber with a disinfecting floor cleaner |
| 10 | Wait | Hold for 15 minutes to allow scrubber to dry |
| 11 | Dry | 1 double passes under air knife to remove residual dust Return to step 1 or step 2 and repeat |

Color Measurements:

The AWT color results are reported in L* a* b* color space. The color was measured using a VeriColor Spectro VS410 non-contact spectrophotometer from X-rite Inc that was fitted to a "robotic" arm. The non-contact spectrophotometer and the "robotic" arm are controlled through the AWT control program. The color of each floor finish is measured, and recorded by the AWT, at twelve to sixteen different locations on the coated WVC tiles. An average of those L* a* b* values is used to determine the color change. The Delta E* color change results are determined by equation 1, where the final measured color is compared to the initial measured color. By definition the measured color at cycle 0 is the initial color data. This color corresponds to next day color. A final color measurement after the last cycle is defined as the final color measurement.

$$\Delta E^* = ((L^*_1 - L^*_2)^2 + (a^*_1 - a^*_2)^2 + (b^*_1 - b^*_2)^2)^{0.5} \quad (1)$$

Floor Polish Performance at a Floor Test at a Grocery Store:

The floor test areas were stripped of residual polish and then repolished in the typical janitorial procedure as follows: The floors were dust mopped to remove loose dirt, a 1 Liter per 4 Liter of water solution of commercial stripper solution (FREEDOM from Johnson Diversey Inc) was applied by string mop at a rate of ca. 1,000 square feet per gallon, after a 5 minute soak period the floors were scrubbed with a propane stripping machine (SIDEWINDER from AZTEC Inc), the floor was thoroughly rinsed by damp mopping with clean water, then the floor was cleaned with an autoscrubber (PE-1700 autoscrubber from Pioneer Eclipse inc) using a blue cleaning pad (Blue Cleaner Pad 5300 from 3M Company), then the floor was rinsed one more time with clean water and allowed to dry. The stripped floors were divided into sections perpendicular to the normal direction of floor traffic flow. To each of the sections four coats of formulation to be tested were applied with a finish mop at a rate of ca. 2,000 square feet per gallon. Each coat was allowed to dry for 30 to 60 minutes before the next coat was applied. Coatings were applied (four coats) to floors composed of homogeneous vinyl composition tiles, and cured at ambient conditions.

After the coatings had cured at ambient conditions, the floors were open to pedestrian traffic. The floor test areas were exposed to foot traffic (ca. 25,000 persons per week) as well as wheeled traffic from shopping carts, maintenance carts, stocking carts, sample trays, etc. The 20 and 60-degree gloss was measured every five to ten days after a sufficient exposure to traffic, machine auto scrubbing with neutral floor detergent solution, and burnishing maintenance was performed on the test floors in the typical janitorial fashions as follows: The floors were dust mopped to remove loose dirt; the floors were machine scrubbed with a Pioneer Eclipse PE-1700 Automatic Scrubber equipped with a 3M Red Cleaner Pad 5200. The cleaning solution charged to the Pioneer Eclipse PE-1700 Automatic Scrubber was Stride neutral floor cleaner from Johnson Diversey at their recommended dilution rate. The 2,000 rpm propane burnishing machine used was a SpeedStar Pioneer ST21K WA from Pioneer Eclipse, Sparta N.C. The SpeedStar propane burnisher was equipped with a 21 inch 3M 3200 TopLine Speed Burnish Pad. The test floors were exposed to two passes of the autoscrubber and burnishing machines, three to five times per week, for a period of 15 weeks.

EXAMPLES

Example #1

Preparation of Latex Polymer

In a suitable reaction vessel equipped with a thermometer, condenser, and stirrer, a solution of 25.90 grams of 23% sodium dodecylbenzene sulfonate (POLYSTEP A-16-22, Stepan Company), 13.74 grams of itaconic acid and 700.1 grams of deionized water was heated to 85° C. A 14.43 gram portion of the monomer emulsion described in Table 3 was added all at once to the reaction vessel and the temperature adjusted to 80-85° C. followed by the kettle charge of ammonium persulfate (APS) catalyst solution 3.15 g dissolved in 14.00 grams water). Within 2 minutes, the onset of polymerization was signaled by a temperature rise of 3° to 5° C. and a change in the appearance (color and opacity) of the reaction mixture. When the exotherm ceased, the remaining monomer mixture and the cofeed catalyst solution 0.61 g APS in 100.00 grams deionized water) were gradually added to the reaction vessel over 90 minutes at about 85° C. (addition times of 90-120 min are preferred) Fifteen minutes after the feeds were complete; the kettle was cooled to 60° C. and chased by adding 1.48 g of 0.15% iron (II) sulfate in 5 g of water, 0.61 g of 70% t-butyl hydroperoxide dissolved in 8.6 g of water and 0.30 g of isoascorbic acid dissolved in 8.6 g of water. A second chase, fifteen minutes later, consisted of 0.61 g of 70% t-butyl hydroperoxide dissolved in 8.60 g of water and 0.30 g of isoascorbic acid dissolved in 8.6 g of water. After 25 minutes, the latex was cooled to 39° C. 17.00 g of 70% polyoxyethylene lauryl alcohol (Thorcowet TDA-40, Thornley Company) dissolved in 35.6 g water was added to the latex and stirred over 10 minutes. 30.0 g of 10% ammonium hydroxide was then added over 15 minutes to adjust the latex pH to 6.7. After a 5 minute hold, a slurry of 9.73 g of calcium hydroxide in 22.7 g of water and a 5 g rinse were added to the kettle and stirred for one hour at 39° C. to obtain 0.270 equivalents of calcium. The level of polyvalent metal ion is a function of the carboxylic acid functional groups content of the polymer. The latex was then cooled and filtered, producing latex modified with 0.27 equivalents of calcium. The latex contained a polymer of 23.5 BA/30.1 MMA/34.2 Styrene/9.0 MAA/1.9 IA/1.3 DVB/0.27 equivalents Ca with a measured Tg of 83° C. Water was then added to provide a solids level of 38 percent.

TABLE 3

| Material | parts by weight |
| --- | --- |
| 208.5 g | Water | |
| 13.84 g | POLYSTEP A-16-22 (23%) (Stepan Company) | |
| 171.76 g | Butyl acrylate (BA) | 23.5 |
| 250.19 g | Styrene | 34.2 |
| 219.92 g | Methyl methacrylate | 30.1 |
| 65.7 g | Methacrylic acid (MAA) | 9.0 |
| 9.38 g | Divinylbenzene (DVB) | 1.3 |

The itaconic acid (13.74 grams, 1.9%) is added directly to the kettle and is not part of the monomer emulsion.

Examples 2-5

Prior art references U.S. Pat. No. 6,586,516 and US2007/0254108A1 disclose similar but not identical polymer compositions to the present invention. While the prior art does disclose the use of covalent and ionic crosslinking in acrylic polymer compositions it does not disclose an appropriate polymer formulation that produces acceptable performance with calcium and/or magnesium. Example 1 through 5 shows comparison of the present invention to the prior art disclosed in U.S. Pat. No. 6,586,516 and US 2007/0254108A1.

A series of styrene-acrylic polymer dispersions were made in the conventional, gradual addition manner, described in example 1, from a monomer emulsion containing a ratio of monomers listed in Table 4. The latex compositions of examples 2-5 are comparative examples and were prepared according to the procedure disclosed in Prior art references U.S. Pat. No. 6,586,516 and US2007/0254108A1. The Tg, of representative polymers, as measure by DSC as previously described, is reported in Table 5. The Tg of comparative example numbers 2 through 4, from the prior art, range from −37° C. to 75° C. The average Tg of example number 1, first and second heat is 83° C.

Floor Coating Compositions:

All performance tests below were performed on formulated coating compositions. The ingredients used to formulate the coating compositions are reported in Table 6. The performance results are listed in the following tables.

TABLE 4

| Ex. # | polm. solids | Monomer composition | metal | Eq. | cross linker | X-link wt % | Add. comp. mon. | Comp. wt % |
|---|---|---|---|---|---|---|---|---|
| 1 | 38% | 1.9 IA/23.5 BA/30.1 MMA/34.2 Sty/ 9.0 MAA/1.3 DVB | Ca | 0.27 | DVB | 1.3 | IA | 1.9 |
| 2 | 34% | 2.5 IA/6 MAM/30 EA/57.5 EHA/ 4 MAA/0.08 ALMA | Zn | 0.40 | ALMA | 0.08 | IA | 2.5 |
| 3 | 35% | 2.5 IA/6 MAM/30 EA/57.5 EHA/ 4 MAA/0.08 ALMA | Ca | 0.18 | ALMA | 0.08 | IA | 2.5 |
| 4 | 38% | 18 BA/50 MMA/20 AAEM/12 MAA | Ca | 0.23 | AAEM | 20 | None | 0.0 |
| 5 | 37% | 24 BA/43 MMA/20 AAEM/ 5 Sty/8 MAA | Mg | 0.28 | AAEM | 20 | None | 0.0 |

AAEM = acetoacetoxyethyl methacrylate = latent cross linker
Eq. = Equivalents of metal ions per total complexing functionality in the emulsion polymer.
X-link wt % = the weight percent of the cross linker in the emulsion polymer.
Add. comp. mon. = identification of the complexing monomer that is in addition to MAA.
Comp. wt % = the weight percent of the complexing momomer in addition to the MAA.

TABLE 5

Tg values for Representative Polymers

| Example | Tg (1st Heat) | Tg (2nd Heat) |
|---|---|---|
| 22 | 83.3 | 79.7 |
| 1 | 84.5 | 81.4 |
| 2 | −36.9 | −37.2 |
| 3 | −36.4 | −37.7 |
| 4 | 74.6 | 75.4 |
| 5 | 59.1 | 58.3 |
| 23 | 77 | 74.7 |
| 24 | 80.9 | 79.2 |
| 29 | 85.6 | 81.5 |
| 32 | 95 | 94.5 |
| 34 | 85.4 | 81.4 |
| 35 | 85.9 | 82.5 |
| 36 | 88.6 | 86 |
| 39 | 86.5 | 84 |
| 41 | 88.6 | 86 |
| 42 | 81.1 | 75.7 |
| 43 | 66.3 | 63.5 |
| 44 | 61.3 | 60.2 |
| 45 | 69.5 | 64.6 |

TABLE 6

| | | US 2007/ 0254108 A1 | | U.S. Pat. No. 6,586,516 B1 | |
|---|---|---|---|---|---|
| | | Formulation ID: | | | |
| Raw Materials | 1A Parts | Comp. 2A Parts | Comp. 3A Parts | Comp. 4A Parts | Comp. 5A Parts |
| Water | 43.36 | 27.80 | 29.70 | 31.47 | 32.54 |
| Defoamer (neat) | 0.02 | 0.02 | 0.02 | 0.02 | 0.02 |
| KATHON CG (1.5%) | 0.03 | 0.03 | 0.03 | 0.03 | 0.03 |
| Wetting Aid (1%) | 0.97 | 1.02 | 1.02 | 1.02 | 1.02 |
| CARBITOL DE | 5.00 | 4.00 | 4.00 | 4.00 | 4.00 |
| DOWANOL DPnP | 0.42 | 0.00 | 0.00 | 0.00 | 0.00 |
| KODAFLEX TXIB | 0.98 | 0.00 | 0.00 | 0.00 | 0.00 |
| Tributoxyethylphosphate | 2.19 | 1.53 | 1.53 | 1.53 | 1.53 |
| Example # 2 | 0.00 | 59.64 | 0.00 | 0.00 | 0.00 |
| Example # 3 | 0.00 | 0.00 | 57.74 | 0.00 | 0.00 |
| Example # 1 | 40.10 | 0.00 | 0.00 | 0.00 | 0.00 |
| Example # 4 | 0.00 | 0.00 | 0.00 | 55.97 | 0.00 |
| Example # 5 | 0.00 | 0.00 | 0.00 | 0.00 | 54.90 |
| CHEMREZ 30 (30%) | 1.16 | 0.00 | 0.00 | 0.00 | 0.00 |
| CHEMCOR 43N (40%) | 0.00 | 2.78 | 2.78 | 2.78 | 2.78 |
| CHEMCOR 325N (35%) | 0.00 | 3.18 | 3.18 | 3.18 | 3.18 |
| MICHEM-44730 (30%) | 5.77 | 0.00 | 0.00 | 0.00 | 0.00 |
| TOTALS: | 100.00 | 100.00 | 100.00 | 100.00 | 100.00 |

Evaluation of Coating Gloss:

The 20 and 60 degree gloss measurements are recorded in Table 7. Formulation 1A, had the best next day gloss for both 20 degree gloss and 60 degree gloss.

Tack-Free Time:

The tack-free time was determined using the zapon test, the test method was previously described. The results recorded in Table 7 are the minutes required to pass the zapon test. Example numbers 1, 4 and 5 had acceptable tack-free time. Example numbers 2 and 3 never became tack-free, even after 48 hours.

Next Day Water Resistance Test:

The surface coatings resistance to damage from water was determined using the next day water resistance test, it was previously described. The results of this tested are reported in Table 7.

TABLE 7

| | Formulation ID: | | | | |
|---|---|---|---|---|---|
| | 1A | Comp. 2A | Comp. 3A | Comp. 4A | Comp. 5A |
| | 20 Degree Gloss Measurements | | | | |
| Fourth Coat | 61 | 55 | 51 | 14 | 51 |
| Next day | 45 | 44 | 41 | 13 | 41 |

TABLE 7-continued

| | Formulation ID: | | | | |
|---|---|---|---|---|---|
| | 1A | Comp. 2A | Comp. 3A | Comp. 4A | Comp. 5A |
| | 60 Degree Gloss Measurements | | | | |
| Fourth Coat | 85 | 82 | 79 | 43 | 80 |
| Next day | 81 | 77 | 74 | 44 | 75 |
| Avg Tack Time: | ≥25 min | >48 Hrs. | >48 Hrs. | 16 min | 17 min |
| Water Resistance | 5 | 4 | 5 | 3 | 4 |

Gloss Retention Using the AWT:

The surface coatings retention of gloss was determined using the AWT. The 20 degree gloss retention results are included in Table 10. The results for the surface coatings retention of 60 degree gloss is reported in Table 11. Formulation 1A had very good gloss retention at the end of the testing on the AWT, where the comparative controls formulation 2A., 4A and 5A had failed this test.

TABLE 10

| | Formulation ID: | | | | |
|---|---|---|---|---|---|
| | 1A | Comp. 2A | Comp. 3A | Comp. 4A | Comp. 5A |
| Initial 20° Gloss | 35 | 33 | NA* | 17 | 38 |
| Final 20° Gloss | 40 | 40 | NA* | 10 | 19 |
| % change in gloss | 14% | 21% | NA* | 41% | 50% |
| gloss retention | Excellent | Excellent | NA* | Poor | Poor |
| Initial visual gloss | Very Good | Poor Streaked | NA* | Poor | Very Good |
| Final visual gloss | Very Good | Poor Streaked | NA* | Film Removed | Film Removed |

*the tackiness of this coating prevented measurement by AWT

TABLE 11

| | Formulation ID: | | | | |
|---|---|---|---|---|---|
| | 1A | Comp. 2A | Comp. 3A | Comp. 4A | Comp. 5A |
| Initial 60° Gloss | 76 | 76 | NA | 52 | 76 |
| Final 60° Gloss | 75 | 75 | NA | 35 | 52 |
| % Change in gloss | −1.3% | 1.3% | NA | 33.0% | 32.0% |

Examples 1 and 6

A series of styrene-acrylic polymer dispersions were made in the conventional, gradual addition manner, as described in example #1, from a monomer emulsion containing a ratio of monomers listed in Table 12. Example 6 is a comparative control that does not contain DVB. The coating composition of example 6 was tested for gloss and compared against the coating composition of example 1. The ingredients used to formulate the latex into a fully formulated floor polish are described in Table 13.

Performance tests were run on fully formulated coating compositions, reported in Table 13, applied under real world conditions, at a grocery store whose floors received regular machine maintenance. The floors where dry mopped every evening (7 days a week) and machine maintained (4 to 5 times per week) with an autoscrubber using a neutral floor cleaner and a red cleaning pad followed by propane burnishing with a 3200 burnish pad. The gloss measurements were routinely recorded for 15 weeks for the polishes listed in Tables 14 and 15.

The results of the 20 degree gloss measurements are reported in Table 14. The 60 degree gloss values from the field trial are reported in Table 15. Comparing Formulation 1B to Formulation 6A shows the improved gloss retention that was achieved when covalent crosslinker, DVB, was included in the emulsion polymer. Formulation 1B retained its 20 degree gloss during the field test, whereas formulation 6A lost 20 degree gloss. Both examples in this field test lost 60 degree gloss over the course of the 15 week test. Note, that formulation 1B lost the less 60 degree gloss than Formulation 6A.

TABLE 12

| Ex. # | polm. solids | Monomer composition | metal | Eq. | cross linker | X-link wt % | Add. comp. mon. | comp wt % |
|---|---|---|---|---|---|---|---|---|
| 6 | 38% | 1.9 IA/23.6 BA/30.1 MMA/ 34.3 Sty/10.1 MAA | Ca | 0.27 | None | 0.0 | IA | 1.9 |
| 7 | 38% | 23.6 BA/30.0 MMA/ 34.4 Sty/12.0 MAA | Zn | 0.35 | None | 0.0 | None | 0.0 |
| 8 | 38% | 23.3 BA/29.8 MMA/34 Sty/ 8.7 MAA/1.0 DVB/3.2 PAM-4000 | Ca | 0.15 | DVB | 1.0 | PAM | 3.2 |
| 9 | 38% | 23.3 BA/29.7 MMA/33.9 Sty/ 8.7 MAA/1.3 DVB/3.2 PAM-4000 | Ca | 0.15 | DVB | 1.3 | PAM | 3.2 |
| 10 | 36% | 23.1 BA/29.5 MMA/33.6 Sty/ 8.6 MAA/1.9 DVB/3.2 PAM-4000 | Ca | 0.27 | DVB | 1.9 | PAM | 3.2 |
| 11 | 38% | 0.5 IA/23.5 BA/30.1 MMA/ 34.2 Sty/10.4 MAA/1.3 DVB | Ca | 0.15 | DVB | 1.3 | IA | 0.5 |
| 12 | 38% | 1.3 IA/23.5 BA/30.1 MMA/ 34.2 Sty/9.6 MAA/1.3 DVB | Ca | 0.15 | DVB | 1.3 | IA | 1.3 |
| 13 | 38% | 1.9 IA/23.4 BA/30.0 MMA/ 34.1 Sty/8.9 MAA/1.7 DVB | Ca | 0.27 | DVB | 1.7 | IA | 1.9 |
| 14 | 38% | 1.9 IA/23.1 BA/29.6 MMA/ 33.6 Sty/10.1 MAA/1.9 DVB | None | 0.00 | DVB | 1.9 | IA | 1.9 |
| 15 | 38% | 1.9 IA/23.1 BA/29.6 MMA/ 33.6 Sty/10.1 MAA/1.9 DVB | Ca | 0.27 | DVB | 1.9 | IA | 1.9 |
| 16 | 38% | 1.9 IA/23.2 BA/29.8 MMA/ 33.7 Sty/10.1 MAA/1.3 DVB | None | 0.00 | DVB | 1.3 | IA | 1.9 |
| 17 | 38% | 1.9 IA/23.2 BA/29.8 MMA/ 33.7 Sty/10.1 MAA/1.3 DVB | Ca | 0.28 | DVB | 1.3 | IA | 1.9 |

TABLE 12-continued

| Ex. # | polm. solids | Monomer composition | metal | Eq. | cross linker | X-link wt % | Add. comp. mon. | comp wt % |
|---|---|---|---|---|---|---|---|---|
| 20 | 37% | 1.9 IA/23.4 BA/30.1 MMA/34.0 Sty/10.1 MAA/0.5 DVB | Ca | 0.15 | DVB | 0.5 | IA | 1.9 |
| 21 | 38% | 4 iBMA/33 BMA/6 BA/45 Sty/12 MAA | Zn | 0.33 | None | 0.0 | None | 0.0 |
| 22 | 38% | 4 iBMA/33 BMA/6 BA/45 Sty/12 MAA | Ca | 0.15 | None | 0.0 | None | 0.0 |
| 23 | 38% | 1.9 IA/5 iBMA/33 BMA/6 BA/45 Sty/9.1 MAA | Ca | 0.27 | None | 0.0 | IA | 1.9 |
| 24 | 38% | 1.9 IA/4.9 iBMA/32.6 BMA/5.9 BA/44.3 Sty/9.1 MAA/0.5 DVB | Ca | 0.27 | DVB | 0.5 | IA | 1.9 |
| 29 | 38% | 35 BA/9 MMA/40 Sty/16 MAA | Zn | 0.58 | None | 0.0 | None | 0.0 |
| 32 | 38% | 1.9 IA/19.7 BA/25.7 MMA/39.5 Sty/11.9 MAA/1.3 DVB | Ca | 0.28 | DVB | 1.3 | IA | 1.9 |
| 34 | 38% | 1.9 IA/19.7 BA/25.7 MMA/39.5 Sty/11.9 MAA/1.3 DVB | Ca | 0.38 | DVB | 1.3 | IA | 1.9 |
| 35 | 38% | 1.9 IA/19.7 BA/25.7 MMA/39.5 Sty/11.9 MAA/1.3 DVB | Ca | 0.48 | DVB | 1.3 | IA | 1.9 |
| 36 | 38% | 1.9 IA/19.7 BA/25.7 MMA/39.5 Sty/11.9 MAA/1.3 DVB | Ca | 0.58 | DVB | 1.3 | IA | 1.9 |
| 47 | 38% | 1.9 IA/33.7 BA/11.9 MMA/39.6 Sty/12.0 MAA/1.0 BGDMA | Ca | 0.28 | BGDMA | 1.0 | IA | 1.9 |
| 39 | 37% | 1.9 AA/1.9 IA/19.7 BA/25.7 MMA/39.5 Sty/10.0 MAA/1.3 DVB | Ca | 0.58 | DVB | 1.3 | IA/AA | 1.9/1.9 |
| 41 | 37% | 1.9 AA/19.7 BA/25.7 MMA/39.5 Sty/12.0 MAA/1.3 DVB | Ca | 0.58 | DVB | 1.3 | AA | 1.9 |
| 42 | 38% | 1.9 IA/24.7 BA/20.7 MMA/39.5 Sty/11.9 MAA/1.3 DVB | Ca | 0.58 | DVB | 1.3 | IA | 1.9 |
| 43 | 37% | 1.9 IA/29.7 BA/15.7 MMA/39.5 Sty/11.9 MAA/1.3 DVB | Ca | 0.58 | DVB | 1.3 | IA | 1.9 |
| 44 | 37% | 1.9 AA/1.9 IA/29.7 BA/15.8 MMA/39.5 Sty/9.9 MAA/1.3 DVB | Ca | 0.58 | DVB | 1.3 | IA | 1.9 |

Eq. = equivalents of metal ions per total acid functionality in the emulsion polymer.

TABLE 13

| | Floor Polish ID: | |
|---|---|---|
| Raw Materials | 1B Parts | 6A Comparative Parts |
| Water | 43.42 | 43.45 |
| SE-21 (neat) | 0.02 | 0.02 |
| KATHON CG (1.5%) | 0.02 | 0.02 |
| Wetting Aid (1%) | 1.28 | 1.28 |
| CARBITOL DE | 5.00 | 5.00 |
| KODAFLEX TXIB | 1.00 | 1.00 |
| Tributoxyethylphosphate | 2.00 | 2.00 |
| Example # 1 | 36.81 | 0.00 |
| Example # 6 | 0.00 | 36.81 |
| ASR PLUS 27 (27%) | 3.24 | 3.24 |
| CHEMCOR 325G (35%) | 5.25 | 5.00 |
| CHEMCOR 43G40 (40%) | 1.97 | 2.19 |
| TOTALS: | 100.00 | 100.00 |

TABLE 14

| | Floor Finish | |
|---|---|---|
| Days on the Floor | 1B 20° Gloss | 6A Comparative 20° Gloss |
| 1 (initial) | 36 | 35 |
| 5 | 28 | 26 |
| 8 | 36 | 24 |
| 12 | 37 | 27 |
| 19 | 37 | 32 |
| 33 | 34 | 27 |
| 40 | 41 | 26 |
| 47 | 41 | 25 |
| 68 | 44 | 32 |
| 75 | 38 | 29 |
| 82 | 37 | 23 |
| 89 | 36 | 26 |
| 96 | 34 | 25 |
| 103 (final) | 37 | 27 |
| Percent change from initial | +2.8% | −22.9% |

TABLE 15

| | Floor Finish ID | |
|---|---|---|
| Days on the Floor | 1B Invention 60° Gloss | 6A comparative 60° Gloss |
| 1 (initial) | 79 | 73 |
| 5 | 64 | 62 |
| 8 | 69 | 57 |
| 12 | 68 | 60 |
| 19 | 65 | 56 |
| 33 | 62 | 54 |
| 40 | 69 | 51 |
| 47 | 69 | 49 |
| 68 | 69 | 54 |
| 75 | 65 | 53 |
| 82 | 59 | 45 |
| 89 | 58 | 48 |
| 96 | 57 | 47 |

TABLE 15-continued

|  | Floor Finish ID | |
|---|---|---|
|  | 1B Invention 60° Gloss | 6A comparative 60° Gloss |
| Days on the Floor | | |
| 103 (final) | 59 | 51 |
| Percent change from initial | −25.3% | −30.1% |

Examples 7-10

A series of styrene-acrylic polymer dispersions were made in the conventional, gradual addition manner, as described in example 1, from a monomer emulsion containing a ratio of monomers listed in Table 12. In this series of examples, a phoshoethylmethacrylate was used as the additional complexing monomer, the specific monomer tested was ethylmethacrylate phosphate (SIPOMER PAM 4000 (PAM), RHODIA Inc, N.J.).

The ingredients of the fully formulated floor polishes are listed in Table 17. Floor polish 7A is the comparative control, it is an emulsion polymer that contains zinc cross linking. The performance of formulations 7A, 8A, 9A and 10A were tested and the results are reported in Table 18. Fully formulated polymers, formulations 8A, 9A and 10A have essentially the same performance as the comparative control formulation 7A, that contains zinc.

TABLE 17

|  | Floor Polish I.D. | | | |
|---|---|---|---|---|
| Raw Materials | 7A Comp. Parts | 8A Parts | 9A Parts | 10A Parts |
| Water | 43.61 | 43.41 | 43.10 | 41.77 |
| Defoamer | 0.02 | 0.02 | 0.02 | 0.02 |
| KATHON CG (1.5%) | 0.04 | 0.04 | 0.04 | 0.04 |
| Wetting Aid (1%) | 1.28 | 1.28 | 1.28 | 1.28 |
| CARBITOL DE | 5.00 | 5.00 | 5.00 | 5.00 |
| KODAFLEX TXIB | 1.00 | 1.00 | 1.00 | 1.00 |
| Tributylethylphosphate | 2.00 | 2.00 | 2.00 | 2.00 |
| Example # 7 | 36.96 | 0.00 | 0.00 | 0.00 |
| Example # 9 | 0.00 | 0.00 | 37.09 | 0.00 |
| Example # 8 | 0.00 | 0.00 | 0.00 | 38.43 |
| Example # 10 | 0.00 | 37.16 | 0.00 | 0.00 |
| ASR PLUS (27%) | 3.19 | 3.19 | 3.24 | 3.24 |
| CHEMCOR 325G (35%) | 3.68 | 3.68 | 5.26 | 5.25 |
| CHEMCOR AC-43G40 (40%) | 3.22 | 3.22 | 1.97 | 1.97 |
| TOTALS | 100.00 | 100.00 | 100.00 | 100.00 |

TABLE 18

|  | Floor Polish I.D. | | | |
|---|---|---|---|---|
|  | 7A | 8A | 9A | 10A |
| Complexing monomer |  | PAM | PAM | PAM |
| Metal | Zn Comp. | Ca | Ca | Ca |
| Rating of lay down gloss (bench) | 4 | 4 | 4 | 4 |
| 20° next day gloss (4 cts) | 43 | 41 | 44 | 40 |
| 60° next day gloss (4 cts) | 78 | 76 | 79 | 78 |
| Haze on BVCT (4 cts CTR) | 5 | 5 | 3 | 4 |
| Leveling | 5 | 5 | 5 | 3 |
| 1 Hr. water resistance | 5 | 4 | 5 | 4 |
| 1 Hr. neutral detergent resistance | 5 | 4 | 5 | 5 |
| 1 Hr. alkaline detergent resistance | 5 | 4 | 5 | 4 |

TABLE 18-continued

|  | Floor Polish I.D. | | | |
|---|---|---|---|---|
|  | 7A | 8A | 9A | 10A |
| Scuff Resistance | 3 | 3 | 3 | 4 |
| Black Heel Mark Resistance | 3 | 3 | 3 | 3 |

SCOF = static coefficient of friction as determined by James Test
Ratings are from 5 (highest) to 1 (lowest)

Examples 11-13

A series of styrene-acrylic polymer dispersions were made in the conventional, gradual addition manner, described in example 1, from a monomer emulsion containing a ratio of monomers listed in Table 12. Example #7 is the comparative control, it is a zinc cross linked emulsion polymer.

Performance tests were run on fully formulated floor polishes whose ingredients are listed in Table 20 and the results are reported in Table 21. The performance of the floor polish based on Ex. 13 was better than the zinc-containing control example #7. The level of covalent cross linking in example #13 was 1.7 weight percent. The two other test finishes examples 11 and 12 had essentially comparable results to the zinc control finish example #7.

TABLE 20

|  | Formulation I.D. | | | |
|---|---|---|---|---|
| Raw Materials | 7A Comp. Parts | 11A Parts | 12A Parts | 13A Parts |
| Water | 43.61 | 43.45 | 43.13 | 43.55 |
| Defoamer | 0.02 | 0.02 | 0.02 | 0.02 |
| KATHON CG (1.5%) | 0.04 | 0.04 | 0.04 | 0.04 |
| Wetting Aid (1%) | 1.28 | 0.97 | 0.97 | 0.97 |
| CARBITOL DE | 5.00 | 5.00 | 5.00 | 5.00 |
| DOWANOL DPnP | 0.00 | 0.42 | 0.42 | 0.42 |
| KODAFLEX TXIB | 1.00 | 0.98 | 0.98 | 0.98 |
| Tributoxyethylphosphate | 2.00 | 2.19 | 2.19 | 2.19 |
| Example # 7 | 36.96 | 0.00 | 0.00 | 0.00 |
| Example # 11 | 0.00 | 40.00 | 0.00 | 0.00 |
| Example # 12 | 0.00 | 0.00 | 40.32 | 0.00 |
| Example # 13 | 0.00 | 0.00 | 0.00 | 39.90 |
| ASR PLUS (27%) | 3.19 | 1.16 | 1.16 | 1.16 |
| MICHEM 44730 (30%) | 0.00 | 5.77 | 5.77 | 5.77 |
| CHEMCOR 325G (35%) | 3.68 | 0.00 | 0.00 | 0.00 |
| CHEMCOR 43G40SP (40%) | 3.22 | 0.00 | 0.00 | 0.00 |
| TOTALS | 100.00 | 100.00 | 100.00 | 100.00 |

TABLE 21

|  | Floor Polish I.D. | | | |
|---|---|---|---|---|
|  | 7A | 11A | 12A | 13A |
| Complexing monomer |  | IA | IA | IA |
| Metal | Zn Comp. | Ca | Ca | Ca |
| Slip resistance (SCOF) | 0.6 | 0.5 | 0.5 | 0.5 |
| Lay down gloss (bench) | 4 | 5 | 4 | 5 |
| 20° next day gloss (4 cts) | 45 | 45 | 44 | 45 |
| 60° next day gloss (4 cts) | 79 | 80 | 80 | 80 |
| Haze on BVCT (4 cts CTR) | 5 | 5 | 5 | 5 |
| Tack-free time | 3 | 3 | 3 | 5 |
| Leveling | 5 | 5 | 5 | 5 |
| Dirt resistance | 3 | 5 | 4 | 4 |
| 1 Hr. water resistance | 5 | 5 | 5 | 5 |
| 1 hr. neut. detergent resistance | 5 | 5 | 5 | 5 |

TABLE 21-continued

| | Floor Polish I.D. | | | |
|---|---|---|---|---|
| | 7A | 11A | 12A | 13A |
| 1 hr. alkali detergent resistance | 4 | 4 | 4 | 5 |
| Scuff Resistance | 3 | 3 | 3 | 3 |
| Black Heel Mark Resistance | 3 | 2 | 2 | 2 |

Examples 14 through 20

A series of styrene-acrylic polymer dispersions were made in the conventional, gradual addition manner, described in example 1, from a monomer emulsion containing a ratio of monomers listed in Table 12. Example 7 is the comparative control, it is a zinc cross linked emulsion polymer.

Performance tests were run on fully formulated floor polishes where the ingredients of the floor polish examples are listed in Table 23. The test results are listed in Table 24. Formulation 16A had the best next day gloss; however, it had a longer tack-free time than the other formulations. Formulation 17A has essentially comparable performance to the zinc containing comparative control Formulation 7A.

TABLE 23

| | Floor Coating ID | | | | | |
|---|---|---|---|---|---|---|
| Raw Materials | 7A Comp. Parts | 14A Parts | 15A Parts | 16A Parts | 17A Parts | 20A Parts |
| Water | 43.61 | 43.39 | 43.39 | 43.68 | 43.39 | 42.49 |
| Defoamer | 0.02 | 0.02 | 0.02 | 0.02 | 0.02 | 0.02 |
| KATHON CG (1.5%) | 0.04 | 0.04 | 0.04 | 0.04 | 0.04 | 0.04 |
| Wetting Aid (1%) | 1.28 | 1.28 | 1.28 | 1.28 | 1.28 | 1.28 |
| CARBITOL DE | 5.00 | 5.00 | 5.00 | 5.00 | 5.00 | 5.00 |
| KODAFLEX TXIB | 1.00 | 1.00 | 1.00 | 1.00 | 1.00 | 1.00 |
| Tributoxyethyl phosphate | 2.00 | 2.00 | 2.00 | 2.00 | 2.00 | 2.00 |
| Example #7 | 36.96 | 0.00 | 0.00 | 0.00 | 0.00 | 0.00 |
| Example #14 | 0.00 | 36.81 | 0.00 | 0.00 | 0.00 | 0.00 |
| Example #15 | 0.00 | 0.00 | 36.81 | 0.00 | 0.00 | 0.00 |
| Example #16 | 0.00 | 0.00 | 0.00 | 36.52 | 0.00 | 0.00 |
| Example #17 | 0.00 | 0.00 | 0.00 | 0.00 | 36.81 | 0.00 |
| Example #20 | 0.00 | 0.00 | 0.00 | 0.00 | 0.00 | 37.71 |
| ASR PLUS (27%) | 3.19 | 3.24 | 3.24 | 3.24 | 3.24 | 3.24 |
| CHEMCOR 325 G (35%) | 3.68 | 5.25 | 5.25 | 5.25 | 5.25 | 5.25 |
| CHEMCOR 43G40SP (40%) | 3.22 | 1.97 | 1.97 | 1.97 | 1.97 | 1.97 |
| TOTALS | 100 | 100 | 100 | 100 | 100 | 100 |

TABLE 24

| | Floor Coating ID | | | | | |
|---|---|---|---|---|---|---|
| | 7A | 14A | 15A | 16A | 17A | 20A |
| Complexing monomer | | IA | IA | IA | IA | IA |
| Metal | Zn Comp. | none | Ca | none | Ca | Ca |
| Lay down gloss (bench) | 4 | 4 | 4 | 5 | 4 | 3 |
| 20° next day gloss (4 cts) | 43 | 44 | 36 | 45 | 43 | 37 |
| 60° nextday gloss (4 cts) | 78 | 77 | 76 | 80 | 79 | 72 |
| Haze on BVCT (4 cts CTR) | 5 | 3 | 3 | 4 | 5 | 5 |
| Tack-free time | 4 | 3 | 4 | 3 | 4 | 3 |
| Leveling | 5 | 5 | 5 | 5 | 5 | 5 |

TABLE 24-continued

| | Floor Coating ID | | | | | |
|---|---|---|---|---|---|---|
| | 7A | 14A | 15A | 16A | 17A | 20A |
| Dirt resistance | 3 | 3 | 4 | 3 | 4 | 3 |
| 1 Hr. water resistance | 5 | 5 | 5 | 5 | 5 | 4 |
| Scuff Resistance | 3 | 3 | 3 | 3 | 3 | 4 |
| Black Heel Mark Resistance | 3 | 4 | 3 | 4 | 3 | 3 |

Examples 21 through 28

A series of styrene-acrylic polymer dispersions were made in the conventional, gradual addition manner, described in example 1, from a monomer emulsion containing a ratio of monomers listed in Table 12. Examples 21, 22 and 23 are comparative emulsion polymers. Performance tests were run on fully formulated floor polishes where the ingredients of the formulations are listed in Table 26. The floor polishes were tested on the AWT in addition to the standard bench tests. The results of bench and AWT tests are reported in Table 27. Formulations 26A, 27A and 28A had essentially comparable gloss retention as determined by the AWT. The comparative control formulation 22B had the best gloss retention of the series, as measured by the AWT. Formulations 25B, 26A, 27A, 28A have out performed the comparative formulations 21A, 22B and 23A for soil resistance as measured by the Soil Resistance Using the AWT Test Method.

TABLE 26

| | Floor Coating ID | | | |
|---|---|---|---|---|
| Raw Materials | 21A comp Parts | 22B comp Parts | 23A comp Parts | 24A Parts |
| Water | 43.01 | 43.53 | 42.48 | 43.59 |
| Defoamer | 0.02 | 0.01 | 0.01 | 0.01 |
| KATHON CG (1.5%) | 0.04 | 0.04 | 0.04 | 0.04 |
| Wetting Aid (1%) | 1.19 | 0.94 | 0.97 | 0.95 |
| CARBITOL DE | 4.59 | 4.39 | 4.56 | 4.45 |
| DOWANOL DPnP | 0.50 | 0.39 | 0.50 | 0.49 |
| KODAFLEX TXIB | 0.50 | 0.49 | 0.50 | 0.69 |
| Tributoxyethyl phosphate | 1.95 | 2.17 | 1.94 | 2.27 |
| Example # 21 | 41.10 | 0.00 | 0.00 | 0.00 |
| Example # 22 | 0.00 | 40.41 | 0.00 | 0.00 |
| Example # 23 | 0.00 | 0.00 | 41.27 | 0.00 |
| Example # 24 | 0.00 | 0.00 | 0.00 | 39.95 |
| CHEMREZ 30 (30%) | 2.37 | 2.34 | 2.37 | 2.32 |
| CHEMCOR 31630SP (30%) | 3.26 | 0.00 | 0.00 | 0.00 |
| MICHEM 44730 (30%) | 1.47 | 5.29 | 5.36 | 5.24 |
| TOTALS | 100 | 100 | 100 | 100 |

TABLE 27

| | Floor Coating ID | | | |
|---|---|---|---|---|
| | 21A | 22B | 23A | 24B |
| Complexing monomer | | | IA | IA |
| Metal | Zn | Ca | Ca | Ca |
| Lay down gloss (bench) | 5 | 3 | 5 | 5 |
| 20° next day gloss (4 cts) | 48 | 39 | 47 | 45 |
| 60° next day gloss (4 cts) | 84 | 78 | 83 | 82 |
| Gloss retention (AWT) | 4 | 4 | 5 | 4 |
| Film form. 10° C. | 1 | 4 | 5 | 3 |
| Tack-free time | 5 | 2 | 3 | 4 |
| Leveling | 4 | 4 | 5 | 5 |
| Dirt resistance | 2 | 3 | 2 | 3 |
| Water resistance | 5 | 5 | 4 | 5 |

TABLE 27-continued

| | Floor Coating ID | | | |
|---|---|---|---|---|
| | 21A | 22B | 23A | 24B |
| Neutral detergent resistance | 5 | 5 | 5 | 5 |
| Alkaline detergent resistance | 5 | 5 | 5 | 5 |

Examples 32 through 36

A series of styrene-acrylic polymer dispersions were made in the conventional, gradual addition manner, as described in example #1, from a monomer emulsion containing a ratio of monomers listed in Table 12. The comparative control latex is example 29, it is a zinc cross linked emulsion polymer. Performance tests were run on fully formulated floor polishes where the ingredients of the floor polish examples are listed in Table 32. The test results are reported in Table 33. The emulsion polymer in example 32 had better performance than examples 31 and 30. The factor (variable) evaluated in this series of experiments is the quantity of Ca. The calcium content is varied from 0.28 eq to 0.58 eq, based on total acidic monomer content. Increasing calcium content should increase the cross link density and improve the scratch, mar and scuff resistance and improve its durability.

TABLE 32

| | Floor coating I.D. | | | | |
|---|---|---|---|---|---|
| Raw materials | 29A Comp. Parts | 32C Parts | 34C Parts | 35C Parts | 36C Parts |
| Water | 43.91 | 43.27 | 43.27 | 43.27 | 43.27 |
| Defoamer (neat) | 0.02 | 0.02 | 0.02 | 0.02 | 0.02 |
| KATHON CG (1.5%) | 0.04 | 0.04 | 0.04 | 0.04 | 0.04 |
| Wetting Aid (1%) | 0.96 | 1.01 | 1.01 | 1.01 | 1.01 |
| CARBITOL DE | 4.54 | 5.07 | 5.07 | 5.07 | 5.07 |
| KODAFLEX TXIB | 1.01 | 0.00 | 0.00 | 0.00 | 0.00 |
| Tributoxy ethyl phosphate | 2.06 | 2.28 | 2.28 | 2.28 | 2.28 |
| Example # 29 | 40.47 | 0.00 | 0.00 | 0.00 | 0.00 |
| Example # 32 | 0.00 | 40.62 | 0.00 | 0.00 | 0.00 |
| Example # 34 | 0.00 | 0.00 | 40.62 | 0.00 | 0.00 |
| Example # 35 | 0.00 | 0.00 | 0.00 | 40.62 | 0.00 |
| Example # 36 | 0.00 | 0.00 | 0.00 | 0.00 | 40.62 |
| CHEMREZ 30 (30%) | 2.33 | 2.37 | 2.37 | 2.37 | 2.37 |
| CHEMCOR 316G30SP (30%) | 2.33 | 0.00 | 0.00 | 0.00 | 0.00 |
| MICHEM 44730 (30%) | 2.33 | 5.32 | 5.32 | 5.32 | 5.32 |
| TOTALS: | 100.00 | 100.00 | 100.00 | 100.00 | 100.00 |

TABLE 33

| | Floor Coating I.D. | | | | |
|---|---|---|---|---|---|
| | 29A | 32C | 34C | 35C | 36C |
| Complexing monomer | | IA | IA | IA | IA |
| Metal | Zn | Ca | Ca | Ca | Ca |
| Mar resistance | 5 | 3 | 3 | 5 | 5 |

Examples 37 through 41

A series of styrene-acrylic polymer dispersions were made in the conventional, gradual addition manner, as described in example #1, from a monomer emulsion containing a ratio of monomers listed in Table 12. The comparative control latex is example 29, it is a zinc cross linked emulsion polymer. Performance tests were run on fully formulated floor polishes whose ingredients are listed in Table 35. The test results are reported in Table 36.

TABLE 35

| | Formulation ID | | |
|---|---|---|---|
| Raw Materials | 29A comp. Parts | 39D Parts | 41D Parts |
| Water | 43.01 | 43.58 | 44.21 |
| Defoamer | 0.02 | 0.02 | 0.02 |
| KATHON CG (1.5%) | 0.04 | 0.04 | 0.04 |
| Wetting Aid (1%) | 1.19 | 0.99 | 0.99 |
| CARBITOL DE | 4.59 | 4.84 | 4.84 |
| DOWANOL DPnP | 0.50 | 0.00 | 0.00 |
| KODAFLEX TXIB | 0.50 | 1.11 | 1.11 |
| tributoxyethyl phosphate | 1.95 | 2.56 | 2.56 |
| Example #29 | 41.10 | 0.00 | 0.00 |
| Example # 39 | 0.00 | 39.54 | 0.00 |
| Example # 41 | 0.00 | 0.00 | 38.91 |
| CHEMREZ 30 (30%) | 2.37 | 2.25 | 2.25 |
| CHEMCOR 31630SP (30%) | 3.26 | 0.00 | 0.00 |
| MICHEM 44730 (30%) | 1.47 | 5.07 | 5.07 |
| TOTALS | 100 | 100 | 100 |

TABLE 36

| | Formulation ID | | |
|---|---|---|---|
| | 29A | 39D | 41D |
| Complexing monomer | None | IA/AA | AA |
| Metal | Zn | Ca | Ca |
| Lay down gloss (bench) | 5 | 5 | 5 |
| 20° next day gloss (4 cts) | 46 | 47 | 48 |
| 60° next day gloss (4 cts) | 81 | 83 | 83 |
| Haze on BVCT (4 cts CTR) | 5 | 5 | 5 |
| Tack-free time | 5 | 5 | 5 |
| Leveling | 5 | 5 | 5 |
| Dirt resistance | 4 | 5 | 5 |
| 1 Hr. water resistance | 5 | 4 | 4 |
| 1 Hr. neutral detergent resistance | 4 | 5 | 5 |
| 1 Hr. alkali detergent resistance | 5 | 2 | 2 |
| 16 hr. alkali detergent resistance | 5 | 3 | 2 |

Example 42 through 44

A series of styrene-acrylic polymer dispersions were made in the conventional, gradual addition manner, as described in example #1, from a monomer emulsion containing a ratio of monomers listed in Table 12. The comparative control latex is example 29, it is a zinc cross linked emulsion polymer. Performance tests were run on fully formulated floor polishes whose ingredients are listed in Table 38. The test results are reported in Table 39.

The quantity of Ca was set to 0.58 equivalents Ca based on total acid. The variables in this series include: Tg of the polymer and the acidic monomer content. The acidic monomers evaluated in this series include MAA, IA and AA (acrylic acid). The total acidity was maintained at 14 weight percent. MAA was replaced by IA, AA or a blend of IA and AA. The Tg of the polymer was adjusted by changing the BA/MMA content of the polymer.

TABLE 38

| | Floor Polish ID | | | |
|---|---|---|---|---|
| Raw Materials | 29A Comp. Parts | 42D Parts | 43D Parts | 44D Parts |
| Water | 43.01 | 43.39 | 43.17 | 42.85 |
| Defoamer | 0.02 | 0.02 | 0.02 | 0.02 |
| KATHON CG (1.5%) | 0.04 | 0.04 | 0.04 | 0.04 |
| Wetting Aid (1%) | 1.19 | 0.99 | 0.99 | 0.99 |
| CARBITOL DE | 4.59 | 4.84 | 4.84 | 4.84 |
| DOWANOL DPnP | 0.50 | 0.00 | 0.00 | 0.00 |
| KODAFLEX TXIB | 0.50 | 1.11 | 1.11 | 1.11 |
| Tributoxyethylphosphate | 1.95 | 2.56 | 2.56 | 2.56 |
| Example # 29 | 41.10 | 0.00 | 0.00 | 0.00 |
| Example # 42 | 0.00 | 39.73 | 0.00 | 0.00 |
| Example # 43 | 0.00 | 0.00 | 39.95 | 0.00 |
| Example # 44 | 0.00 | 0.00 | 0.00 | 40.27 |
| CHEMREZ 30 (30%) | 2.37 | 2.25 | 2.25 | 2.25 |
| CHEMCOR 31630SP (30%) | 3.26 | 0.00 | 0.00 | 0.00 |
| MICHEM 44730 (30%) | 1.47 | 5.07 | 5.07 | 5.07 |
| TOTALS | 100.00 | 100.00 | 100.00 | 100.00 |

TABLE 39

| | Floor polish ID. | | | |
|---|---|---|---|---|
| | 29A | 42D | 43D | 44D |
| Complexing monomer | None | IA | IA | IA/AA |
| metal | Zn | Ca | Ca | Ca |
| Lay down gloss (bench) | 5 | 5 | 4 | 4 |
| 20° next day gloss (4 cts) | 46 | 47 | 45 | 42 |
| 60° next day gloss (4 cts) | 81 | 83 | 79 | 77 |
| Haze on BVCT (4 cts CTR) | 5 | 5 | 5 | 5 |
| Tack-free time | 5 | 5 | 5 | 5 |
| Leveling | 5 | 5 | 5 | 5 |
| Dirt resistance | 4 | 3 | 3 | 2 |
| 1 Hr. water resistance | 5 | 5 | 5 | 5 |
| 1 Hr. neutral detergent resistance | 4 | 5 | 5 | 5 |
| 1 Hr. alkaline detergent resistance | 5 | 3 | 3 | 2 |
| 16 Hr. alkaline detergent resistance | 5 | 4 | 3 | 3 |

Examples 45

The monomer type and level for Ex. 45 is reported in Table 12. Performance tests were run on fully formulated floor polishes whose ingredients are listed in Table 41. The test results are reported in Table 42. The composition of Exs. 45 contains magnesium (0.28 equivalents based on total acidic monomer).

TABLE 41

| | Floor Coating | |
|---|---|---|
| Raw Materials | 29A Comp. Parts | 45B Parts |
| Water | 43.01 | 43.81 |
| Defoamer | 0.02 | 0.02 |
| Kathon CG (1.5%) | 0.04 | 0.04 |
| Wetting Aid (1%) | 1.19 | 0.98 |
| CARBITOL DE | 4.59 | 4.89 |
| DOWANOL DPnP | 0.50 | 0.00 |
| KODAFLEX TXIB | 0.50 | 1.30 |
| Tributoxyethylphosphate | 1.95 | 2.20 |
| Example # 29 | 41.10 | 0.00 |
| Example # 45 | 0.00 | 39.32 |
| CHEMREZ 30 (30%) | 2.37 | 2.29 |
| CHEMCOR 31630SP (30%) | 3.26 | 0.00 |
| MICHEM 44730 (30%) | 1.47 | 5.15 |
| TOTALS | 100.00 | 100.00 |

TABLE 42

| | Floor coating I.D. | |
|---|---|---|
| | 29A | 45B |
| Complexing monomer | None | IA |
| Metal | Zn | Mg |
| lay down gloss (bench) | 5 | 4 |
| 20 Degree next day gloss (4 cts) | 46 | 52 |
| 60 Degree next day gloss (4 cts) | 81 | 83 |
| Haze on BVCT (4 cts CTR) | 5 | 5 |
| Tack-free time | 5 | 5 |
| Leveling | 5 | 5 |
| Dirt resistance | 4 | NM |
| 1 Hr. water resistance | 5 | 4 |
| 1 Hr. neutral detergent resistance | 4 | 5 |
| 1 Hr. alkaline detergent resistance | 5 | 2 |
| 16 Hr. alkaline detergent resistance | 5 | 2 |

Examples 46

The procedure for the preparation of the latex for example 46 was described in example 1 except that the monomer type and level is reported in Table 12. The comparative control latex is example 29, it is a zinc cross linked emulsion polymer. Performance tests were run on fully formulated floor polishes where the ingredients of the floor polish examples are listed in Table 43. The test results are reported in Table 44. The composition of Exs. 46 is cross linked with Ca (0.28 equivalents based on total acidic monomer) and BGDMA.

TABLE 43

| | Floor Coating | |
|---|---|---|
| Raw Materials | 29A Comp. Parts | 46A Parts |
| Water | 43.01 | 43.91 |
| Defoamer | 0.02 | 0.02 |
| Kathon CG (1.5%) | 0.04 | 0.04 |
| Wetting Aid (1%) | 1.19 | 0.96 |
| CARBITOL DE | 4.59 | 4.54 |
| DOWANOL DPnP | 0.50 | 0.00 |
| KODAFLEX TXIB | 0.50 | 1.01 |
| Tributoxyethylphosphate | 1.95 | 2.06 |
| Example # 29 | 41.10 | 0.00 |
| Example # 46 | 0.00 | 40.47 |
| CHEMREZ 30 (30%) | 2.37 | 2.33 |
| CHEMCOR 31630SP (30%) | 3.26 | 2.33 |
| MICHEM 44730 (30%) | 1.47 | 2.33 |
| TOTALS | 100.00 | 100.00 |

TABLE 44

|  | Floor coating I.D. | |
| --- | --- | --- |
|  | 29A | 45B |
| Complexing monomer | None | IA |
| Metal | Zn | Ca |
| lay down gloss (bench) | 5 | 4 |
| 20 Degree next day gloss (5 cts) | 60 | 56 |
| 60 Degree next day gloss (5 cts) | 87 | 84 |
| Haze on BVCT (4 cts CTR) | 5 | 5 |
| Tack-free time | 5 | 4 |
| Leveling | 5 | 4 |
| Dirt resistance | 4 | 2 |
| 1 Hr. water resistance | 5 | 5 |
| 1 Hr. neutral detergent resistance | 4 | NM |
| 1 Hr. alkaline detergent resistance | 5 | 4 |
| 16 Hr. alkaline detergent resistance | 5 | 4 |

The invention claimed is:

1. An aqueous coating composition comprising: (a) ions of calcium, magnesium, or a combination thereof; and (b) at least one polymer comprising polymerized residues of: (i) from 0.5 to 7 wt % of at least one complexing monomer having a log stability constant for calcium or magnesium from 0.3 to 4 and which is phosphoethyl methacrylate; (ii) from 5 to 15 wt % methacrylic acid; and (iii) from 0.2 to 3 wt % of at least one crosslinker which comprises two or more ethylenically unsaturated groups; wherein the polymer has a Tg from 50 to 110° C.

2. The composition of claim 1 in which the ions (a) are calcium ions.

3. The composition of claim 1 in which the polymer comprises polymerized residues of: (i) from 1 to 6 wt % of phosphoethyl methacrylate; (ii) from 6 to 13 wt % methacrylic acid; (iii) from 0.5 to 2.7 wt % of at least one crosslinker; and (iv) from 25 to 45 wt % of at least one vinyl aromatic monomer; and wherein the polymer has a Tg from 60 to 100° C.

4. The composition of claim 3 in which the polymer comprises polymerized residues of (iii) a diethylenically unsaturated crosslinker.

5. The composition of claim 3 in which said at least one vinyl aromatic monomer (iv) includes styrene.

6. The composition of either of claim 1 or 3 in which the polymer further comprises from 38 to 60% polymerized residues of $C_1$-$C_8$ alkyl (meth)acrylates which are selected from the group consisting of $C_1$-$C_4$ alkyl methacrylates and $C_4$-$C_8$ alkyl acrylates.

7. The composition of claim 5 in which the diethylenically unsaturated crosslinker has a molecular weight from 100 to 250.

8. The composition of claim 1 in which said at least one crosslinker (iii) comprises a diethylenically unsaturated crosslinker.

9. The composition of claim 1 in which the polymer comprises from 0.1 to 0.6 equivalents of calcium per equivalent of acid monomer.

10. The composition of claim 6 in which the $C_1$-$C_4$ alkyl methacrylates are selected from the group consisting of methyl methacrylate, ethyl methacrylate, butyl methacrylate, iso-nutyl methacrylate, and combinations thereof, and the $C_4$-$C_8$ alkyl acrylates are selected from the group consisting of butyl acrylate, ethylhexyl acrylate, and combinations thereof.

11. The composition of claim 1 in which said at least one crosslinker comprises divinyl benzene.

12. A method for coating a substrate by applying the aqueous coating composition of claim 1 to the substrate.

13. The composition of claim 3 in which said at least one vinyl aromatic monomer (iv) comprises styrene.

* * * * *